(12) United States Patent
Otsuki et al.

(10) Patent No.: US 6,696,646 B2
(45) Date of Patent: Feb. 24, 2004

(54) CONSTRUCTION FOR PREVENTING WATER FROM PENETRATING BETWEEN ELECTRIC WIRES INSERTED INTO GROMMET

(75) Inventors: Hiroyuki Otsuki, Yokkaichi (JP); Tsutomu Sakata, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 10/152,904

(22) Filed: May 21, 2002

(65) Prior Publication Data

US 2002/0185297 A1 Dec. 12, 2002

(30) Foreign Application Priority Data

Jun. 8, 2001 (JP) ........................................ 2001-174462

(51) Int. Cl.[7] ................................................. H02G 3/18
(52) U.S. Cl. ................ 174/65 G; 174/153 G; 16/2.1; 16/2.2; 248/56
(58) Field of Search ............... 174/65 G, 152 G, 174/153 G, 135, 151, 65 R; 16/2.1, 2.2; 248/56

(56) References Cited

U.S. PATENT DOCUMENTS 6,010,134 A * 1/2000 Katoh ..................... 174/65 G
6,218,625 B1 * 4/2001 Pulaski ................... 174/153 G
6,438,828 B1 * 8/2002 Uchiyama ............... 174/152 G

* cited by examiner

Primary Examiner—Dhiru R Patel
(74) Attorney, Agent, or Firm—Harness, Dickey & Pierce, P.L.C.

(57) ABSTRACT

A construction for preventing water from penetrating between electric wires (W) inserted into an electric wire insertion portion (10c) of a grommet (10) has a foamed sheet (11) with independent cells. The foamed sheet (11) has an adhesive layer (11b) formed on its upper surface and an adhesive layer (11c) formed on its lower surface. A plurality of the electric wires (W) are disposed parallel with one another at required intervals on the foamed sheet (11). The electric wires are positioned in a region whose area is approximately half of the total area of the adhesive layer (11b) formed on the upper surface of the foamed sheet (11). The foamed sheet (11) is folded upon itself to sandwich the electric wires (W) between the adhesive layer (11b) formed on the upper surface. Thereafter the folded foamed sheet (11) is rolled to dispose the plurality of the electric wires (W) at required intervals in the foamed sheet. The adhesive layer formed on the lower surface of the foamed sheet is bonded to itself.

18 Claims, 5 Drawing Sheets

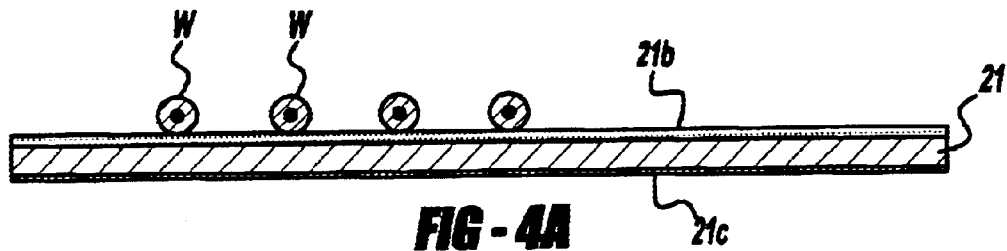
FIG - 4A
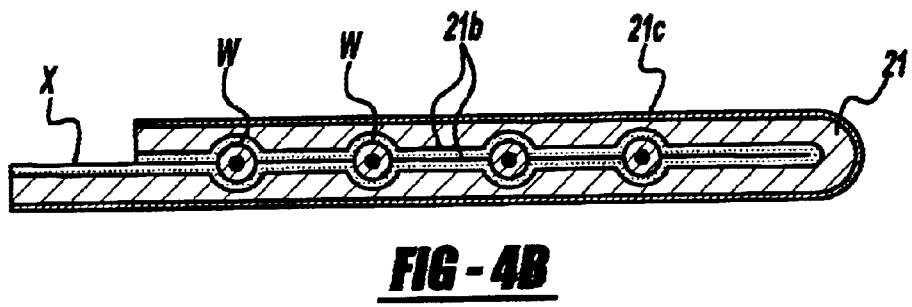
FIG - 4B
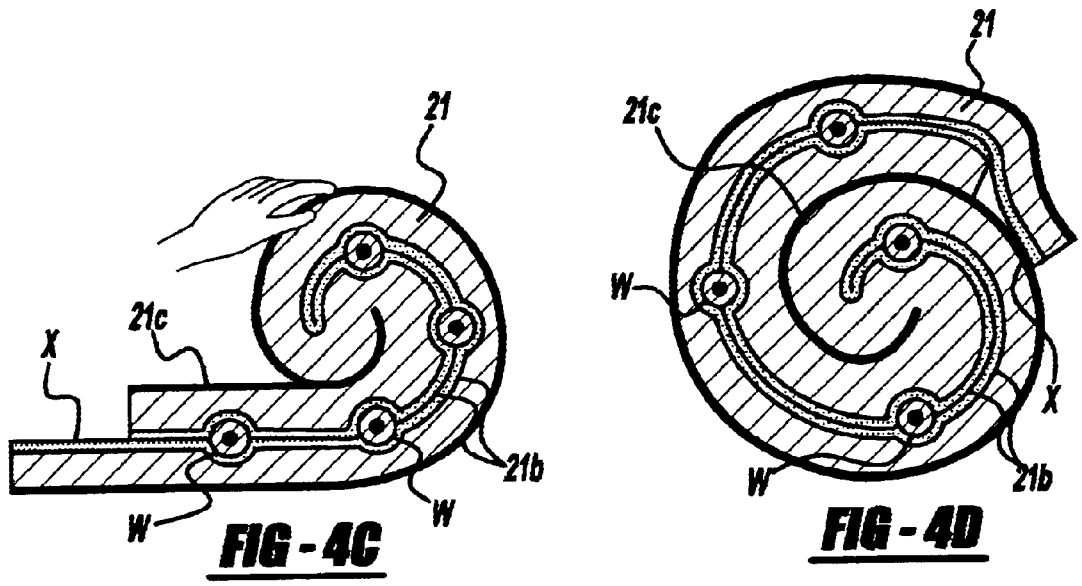
FIG - 4C          FIG - 4D

CONSTRUCTION FOR PREVENTING WATER FROM PENETRATING BETWEEN ELECTRIC WIRES INSERTED INTO GROMMET

CROSS-REFERENCE TO RELATED APPLICATIONS

This application claims priority to Japanese Patent Application No. 2001-174462 filed Jun. 8, 2001, which application is herein expressly incorporated by reference.

1. Field of the Invention

The present invention relates to a construction that prevents water from penetrating between electric wires inserted into a grommet. More particularly, the present invention improves water penetration prevention between electric wires of a wire harness, inserted into the grommet. Generally, the wire harness is installed in a through-hole of a panel or the like of a vehicle body.

2. Background of the Invention

In vehicles, a rubber grommet is used to waterproof the through-hole of a partitioning wall when a wire harness is passed through the through-hole. A plurality of electric wires which constitute the wire harness are inserted into the grommet. There is a fear that water penetration may occur due to the difference between the atmospheric pressure of an engine compartment and the interior of the vehicle.

Japanese Patent Application Laid-Open No. 2000-165061 discloses a construction to prevent water from penetrating between electric wires which are to be inserted into a grommet. FIGS. 5A and 5B, illustrate a construction to prevent water from penetrating between electric wires. The electric wires W of the wire harness are rolled to be inserted into the electric wire insertion portion 2 of the grommet 1. The electric wires W are disposed at required intervals and sandwiched between the foamed sheets 3. Thereafter, the electric wires W are inserted into the electric wire insertion portion 2. During this step the electric wires W are compressed. Thus, the electric wires W are independently surrounded by the foamed sheet 3. Since gaps do not occur between the electric wires W, it is possible to prevent water from penetrating through the gaps between the electric wires W.

In the above-described water penetration prevention construction, the electric wires W are sandwiched between the foamed sheet 3. An adhesive is applied to one of the sheets and the electric wires W are sandwiched between the upper and lower foamed sheets 3. Thereafter the electric wires W are rolled. The surface of the foamed sheet 3 without the adhesive is rough. Thus, it is possible that when the foamed sheet 3 is rolled and the rough surface contacts itself, depending on the compressed state of the rolled foamed sheet 3, the possibility exists that slight gaps may form in the contact portion of the rough surfaces which enable water to penetrate into the gaps and, in turn, the wires.

SUMMARY OF THE INVENTION

Accordingly, it is an object of the present invention to provide a water penetration prevention construction. The construction prevents gaps from forming on a contact portion of a foamed sheet during rolling of the electric wires while the electric wires are sandwiched between the foamed sheets.

To achieve the object, a foamed sheet having independent cells is provided to prevent water from penetrating between electric wires inserted into an electric wire insertion portion of a grommet.

In the construction, the foamed sheet has an adhesive layer on its upper and lower surfaces. A plurality of the electric wires are disposed at required intervals in a region whose area is approximately half of that of the adhesive layer formed on the upper surface of the foamed sheet. The foamed sheet is folded on itself to sandwich the electric wires between the adhesive layer formed on the upper surface. The folded foamed sheet is rolled to dispose a plurality of the electric wires in the foamed sheet. The adhesive layer formed on the lower surface of the foamed sheet is bonded to itself.

According to the water penetration prevention construction, in the portion of the foamed sheet where the electric wires are disposed, the adhesive layer sandwiches the electric wires. The adhesive layer is in contact with itself. Thus, the adhesive layer is capable of closely surrounding the periphery of the electric wires and adhering to itself at its boundary. Accordingly, when the foamed sheet is rolled, the lower surface of the foamed sheet that does not sandwich the electric wires therebetween contacts itself. Because the adhesive layer is also formed on the lower surface of the foamed sheet, it is possible to secure a state in which the adhesive layer adheres to itself. Accordingly the foamed sheet does not have a gap between the lower surface that contacts itself, thus ensuring water penetration prevention performance.

In another aspect of the present invention, a foamed sheet having independent cells is provided to prevent water from penetrating between electric wires inserted into an electric wire insertion portion of a grommet.

In the construction, the foamed sheet has an adhesive layer on an upper surface and a smooth film layer on a lower surface. A plurality of the electric wires are disposed at required intervals in a region that is approximately half of that of the adhesive layer formed on the upper surface of the foamed sheet. The foamed sheet is folded upon itself to sandwich the electric wires between the adhesive layer formed on the upper surface, the folded foamed sheet is rolled to dispose a plurality of the electric wires in the foamed sheet. The film layer, formed on the lower surface of the foamed sheet is in contact with itself.

More specifically, the smooth film layer can be obtained by making the foamed sheet of chloroprene rubber. According to the above-described construction, when the foamed sheet is folded and rolled, the lower surface of the foamed sheet including the smooth film layer, contacts itself. Thus the foamed sheet does not have a gap between the lower surface. This ensures a water penetration prevention effect that is similar to that of the water penetration construction having the adhesive layer. Further, during rolling of the foamed sheet, even though the smooth film layer formed on the lower surface touches the operator's hands, the smooth film layer does not stick to the operator's hands unlike the adhesive layer. Thus, it is possible to improve the operability during rolling of the foamed sheet.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 4A through 4D are cross sectional views of a second embodiment of a process of obtaining a construction to prevent water from penetrating between electric wires inserted into a grommet.

DETAILED DESCRIPTION OF THE PREFERRED EMBODIMENTS

The following description of the preferred embodiment(s) is merely exemplary in nature and is in no way intended to limit the invention, its application, or uses.

Figure 1:
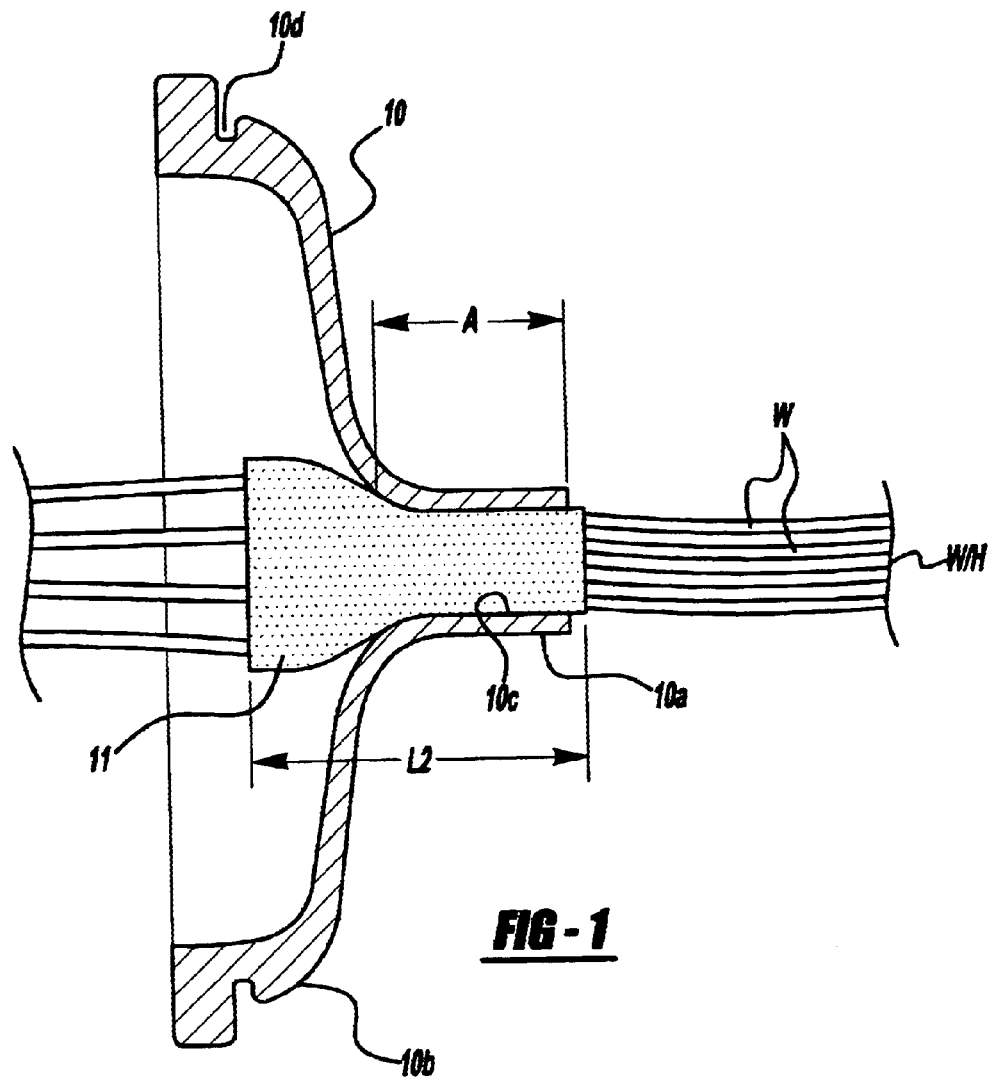
FIG. 1 is a sectional view of a first embodiment of the present invention, which prevents water from penetrating between electric wires inserted into a grommet.

FIG. 1 illustrates a construction to prevent water from penetrating between electric wires inserted into a grommet 10 according to the first embodiment of the present invention. A plurality of electric wires held by a foamed sheet 11 to form a wire harness W/H are inserted into the grommet 10. The wire harness of the present invention includes a bundle of two to eight electric wires W.

The grommet 10 is made of a rubber or elastomeric material. The grommet 10 has a cylindrical small-diameter part 10a. A large-diameter part 10b is continuous with one end of the small-diameter part 10a. An electric wire insertion portion 10c is formed in a continuous inner space of the grommet 10. The inner diameter of the small-diameter part 10a is about 6 mm smaller than a total outer diameter (14 mm) of the electric wires W of the wire harness W/H bundled in the foamed sheet 11. An annular locking groove 10d, which engages a through-hole of a panel of a vehicle body, is concavely formed on the peripheral surface of the large-diameter part 10b.

Figure 2A:
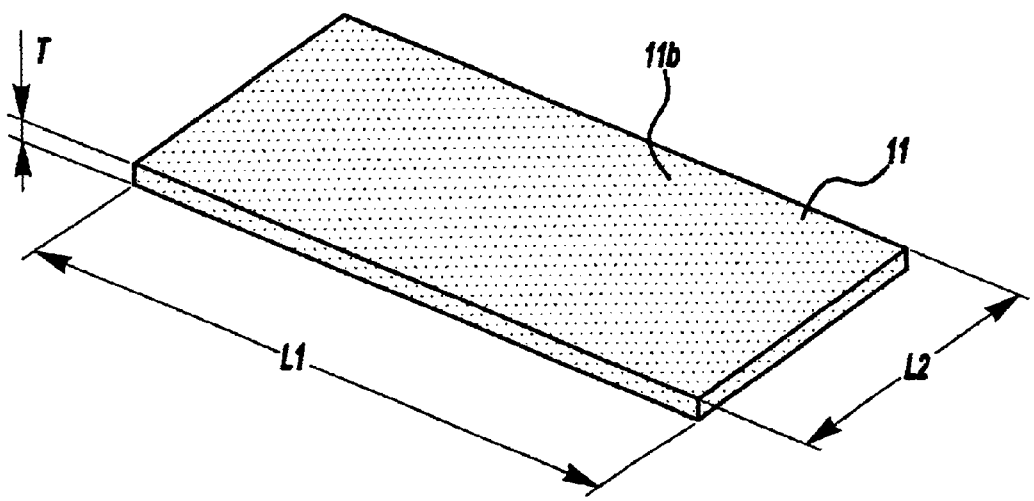
FIG. 2A is a perspective view of a foamed sheet.
Figure 2B:
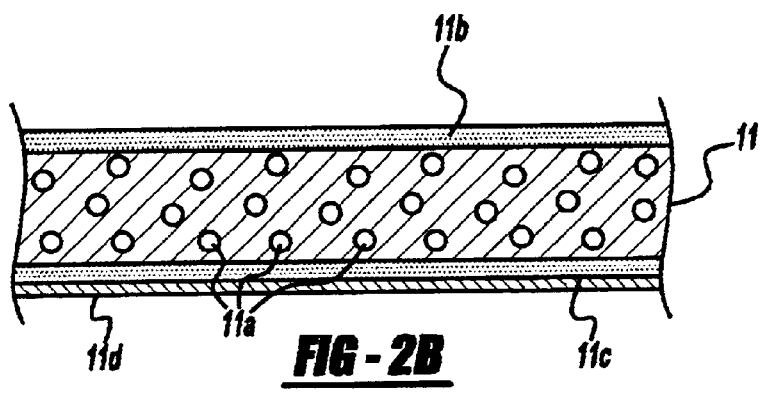
FIG. 2B is a sectional view of FIG. 2A.

As shown in FIGS. 2A and 2B, the foamed sheet 11 is made of rubber or foamed urethane. Accordingly, the foam sheet 11 has a large number of closed cells 11a. In the first embodiment, the foamed sheet 11 has adhesive layers 11b and 11c. Each adhesive layer being an adhesive agent applied to upper and lower surfaces of the foam sheet 11. It is essential that the adhesive layer 11c disposed at the lower surface of the foamed sheet 11 includes a release sheet 11d.

The thickness T of the foamed sheet 11 is about 1.5 mm. The width L1 of the foamed sheet 11 is wide enough to double fold upon itself and cover two to eight electric wires W arranged parallel with one another at 4 mm intervals. The width L1 includes a 10 mm as a bonding margin X having a 10 mm width. For example, the width L1 of the foamed sheet 11 is about 100 mm in the case where eight covered electric wires with a 1.6 mm diameter are used. The length L2 of the foamed sheet 11 is set longer than the length A of the small-diameter part 10a of the grommet 10 by about 10 mm.

Figure 3A:
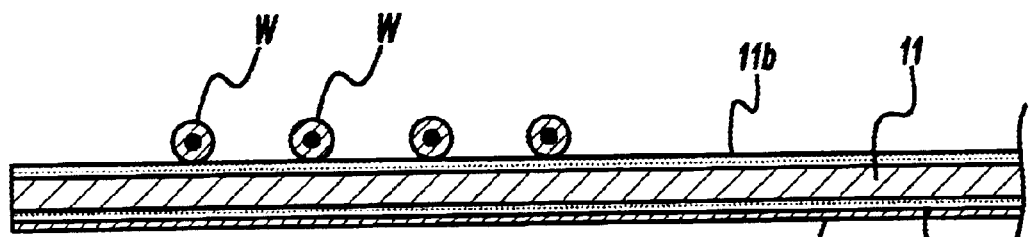
FIGS. 3A through 3C are cross-sectional view of the process of obtaining the construction to prevent water from penetrating between electric wires inserted into a grommet.
Figure 3B:
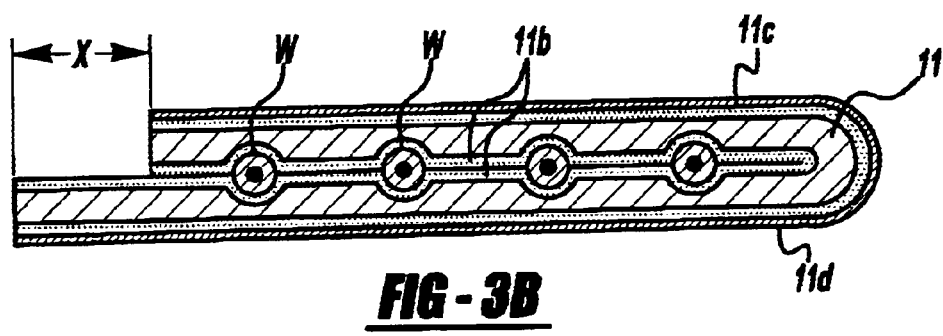

In order to form the wire harness W/H, which is inserted into the grommet 10 as shown in FIG. 3A, a plurality of the electric wires W are arranged parallel with one another at required intervals along the longitudinal direction of the foamed sheet 11. The wires W are arranged in a region whose area is about half of the area of the upper surface of the foamed sheet 11. The wires are placed on the adhesive layer 11b. Thereafter, as shown in FIG. 3B, a portion of the foamed sheet 11, on which the electric wires W are not disposed is folded double upon itself. The adhesive layer 11b of the foamed sheet 11 is laid upon itself and the electric wires W are sandwiched between the adhesive layer 11b of the foamed sheet 11. At this time, a bonding margin X is left at an end of the foamed sheet 11. The electric wires W are sandwiched between the folded upper and lower foamed sheet 11. Further the adhesive layer 11b adheres to itself in the portion between the adjacent electric wires W, thus completely enclosing the electric wires W.

Figure 3C:
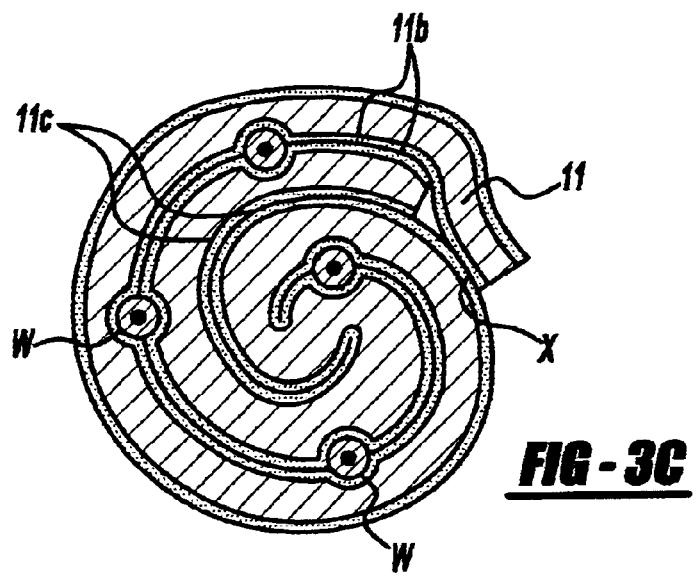
Figure 5A:
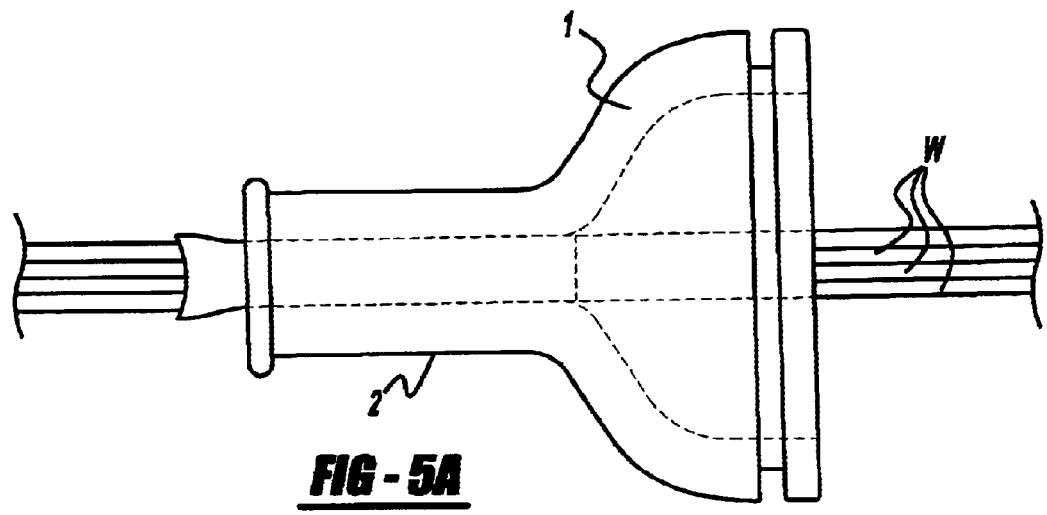
FIGS. 5A and 5B are elevational views of an example of a conventional construction to prevent water from penetrating between electric wires inserted into a grommet.
Figure 5B:
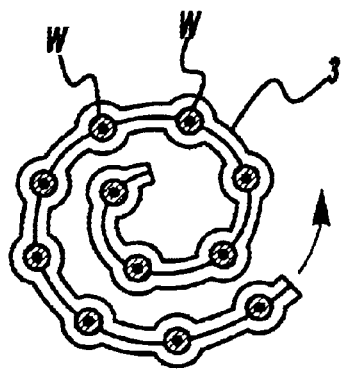

Thereafter the release sheet 11d is removed. The adhesive layer 11c, which constitutes the lower layer of the foamed sheet 11, is exposed. The foamed sheet 11 is rolled from the folded side upon itself. The electric wires W are enclosed in the foamed sheet 11 in a rolled state by adhering the bonding margin X, formed at the end of the foamed sheet 11, to the adhesive layer 11c. Further, as seen in FIG. 3C, the adhesive layer 11c at the lower side of the foamed sheet 11 adheres to itself to generate a complete hermetically sealed state. A plurality of the electric wires W contained in the foamed sheet 11 do not contact one another in any direction. The electric wires W are spaced from each other with the periphery surrounded by adhesive layers 11b and 11c. Thus, it is possible to prevent the rolled foamed sheet 11 from having a gap. By prohibiting a gap, communication between the electric wires W in the longitudinal direction does not exist. Thus, this construction prevents water from penetrating between the electric wires W.

As shown in FIG. 1, after the electric wires W are enclosed in the foamed sheet 11 in a rolled state, the rolled state is inserted into the electric wire insertion portion 10c. The diameter of the insertion portion 11c is increased by using a known grommet diameter-increasing instrument (not shown). The entire foamed sheet 11, in the rolled state, is compressed by the elasticity of the electric wire insertion portion 10c. Accordingly, a further favorable water penetration prevention effect can be displayed. After the foamed sheet 11 is inserted into the grommet 10, the peripheral side of the electric wire insertion portion 10c and the foamed sheet 11 can be reliably fixed by a normal taping operation.

FIGS. 4A–4D illustrate a second embodiment of the present invention. The foamed sheet 21 is a chloroprene rubber. An adhesive layer 21b is formed only on the upper surface of the foamed sheet 21. A flat film layer 21c is formed on the lower surface of the foamed sheet 21. Because other constructions of the second embodiment are similar to those of the first embodiment, they are denoted by the reference numerals of the first embodiment and description is omitted.

In order to obtain a construction to prevent water from penetrating between electric wires W by using the foamed sheet 21, as shown in FIGS. 4A and 4B, as in the first embodiment, a plurality of electric wires W are arranged at required intervals on the foamed sheet 21. The electric wires W are positioned in a region whose area is approximately half of the area of the adhesive layer 21b. The foamed sheet 21 is folded double upon itself to seal the electric wires W therein. Thereafter, as shown in FIG. 4C, the film layer 21c, formed on the lower side of the foamed sheet 21 with no adhesive layer, is rolled on itself. Since there is no adhesive on the film layer 21c, during rolling, there is no possibility that the lower side of the foamed sheet 21 will stick to the operator's hands. Thus, workability is not deteriorated by the lower side of the foamed sheet 21. After the foamed sheet 21 is completely rolled, as shown in FIG. 4D, the adhesive layer 21b, present on the bonding margin X, is bonded to the lower film layer 21c. Accordingly, the rolled state can be maintained.

As in the first embodiment, in the rolled state, the electric wires W are sealed in the foamed sheet 21. The electric wires W are disposed at desired intervals and surrounded by the adhesive layer 21b. In the contact portion of the lower surface of the foamed sheet 21, the smooth film layer 21c which closely contacts itself and does not create a gap. Accordingly, the foamed sheet displays high performance characteristics to prevent water from penetrating between the electric wires W. As in the first embodiment, the compressed rolled foamed sheet 21, with the plurality of electric wires W, is inserted into the electric wire insertion portion 10c of the grommet 10. In this embodiment, when inserting the rolled foamed sheet 21 into the electric wire insertion portion 10c, the film layer 21c abuts the wire insertion portion 10c. Since the foamed sheet 21 does not stick to operator's hands, it is easy to handle the foamed sheet 21 and it is possible to obtain favorable adhesiveness between the foamed sheet 21 and the electric wire insertion portion 10c.

As apparent from the foregoing description, according to the construction of the present invention, water is prevented from penetrating between electric wires inserted into a grommet. A gap is prevented between the electrical wires due to the foamed sheet being interposed between the electric wires which are to be inserted into the grommet. Thus, it is possible to prevent water penetration since no gap is present between the electric wires. Further because the electric wires are surrounded with the adhesive layer formed on the foamed sheet, it is possible to obtain effective and reliable water penetration prevention. Furthermore when the foamed sheet is rolled, the foamed sheet contacts itself such that adhesive layer adheres to itself or the smooth film layer closely contacts itself. Thus, it is possible to prohibit water from penetrating between contact surfaces.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A construction for preventing water from penetrating between electric wires inserted into an electric wire insertion portion of a grommet comprising:
    a foamed sheet having independent cells, said foamed sheet having an adhesive layer on its upper surface and a lower surface having a smooth film layer or an adhesive layer;
    a plurality of electric wires disposed at required intervals in a region whose area is approximately half of total area of said adhesive layer formed on said upper surface of said foamed sheet;
    said foamed sheet being folded upon itself to sandwich said electric wires so as to adhere said upper adhesive layer to said upper adhesive layer; and said folded foamed sheet being rolled to dispose said plurality of said electric wires in said foamed sheet, and said adhesive layer or smooth film layer formed on said lower surface of the said foamed sheet, during said rolling, said lower adhesive layer or said film layer contacting said lower adhesive layer or said film layer, respectively, to eliminate gaps.

2. The construction according to claim 1 wherein the space between adjacent said wires is 4 mm.

3. The construction according to claim 1 wherein said foam sheet having a width equal to two times the diameter of each wire plus a 4 mm gap between each said wire.

4. The construction according to claim 3 wherein said width includes an additional bonding margin.

5. The construction according to claim 4 wherein said bonding margin having a width of 10 mm.

6. The construction according to claim 1 wherein said foam sheet having a length about 10 mm greater than a length of a small diameter portion of a receiving grommet.

7. A construction for preventing water from penetrating between electric wires inserted into an electric wire insertion portion of a grommet comprising:
    a foamed sheet having independent cells, said foamed sheet having an adhesive layer on an upper surface and a smooth film layer on a lower surface;
    a plurality of electric wires disposed at required intervals in a region whose area is approximately half of total area of said adhesive layer formed on said upper surface of said foamed sheet, said foamed sheet is folded upon itself to sandwich said electric wires so as to adhere said upper adhesive layer to said upper adhesive layer; and said folded foamed sheet being rolled to dispose said plurality of said electric wires in said foamed sheet, and said film layer formed on said lower surface of the said foamed sheet, during said rolling, contacting said lower film layer to eliminate a gap.

8. The construction according to claim 7 wherein the space between adjacent said wires is 4 mm.

9. The construction according to claim 7 wherein said foam sheet having a width equal to two times the diameter of each wire plus a 4 mm gap between each said wire.

10. The construction according to claim 9 wherein said width includes an additional bonding margin.

11. The construction according to claim 10 wherein said bonding margin having a width of 10 mm.

12. The construction according to claim 7 wherein said foam sheet having a length about 10 mm greater than a length of a small diameter portion of a receiving grommet.

13. A construction for preventing water from penetrating between electric wires inserted into an electric wire insertion portion of a grommet comprising:
    a foamed sheet having independent cells, said foamed sheet having an adhesive layer on its upper and lower surfaces;
    a plurality of electric wires disposed at required intervals in a region whose area is approximately half of total area of said adhesive layer formed on said upper surface of said foamed sheet;
    said foamed sheet being folded upon itself to sandwich said electric wires so as to adhere said upper adhesive layer to said upper adhesive layer; and said folded foamed sheet being rolled to dispose said plurality of said electric wires in said foamed sheet, and said adhesive layer formed on said lower surface of the said foamed sheet, during said rolling, contacting said lower adhesive layer to eliminate gaps.

14. The construction according to claim 13 wherein the space between adjacent said wires is 4 mm.

15. The construction according to claim 13 wherein said foam sheet having a width equal to two times the diameter of each wire plus a 4 mm gap between each said wire.

16. The construction according to claim 15 wherein said width including an additional bonding margin.

17. The construction according to claim 16 wherein said bonding margin having a width 10 mm.

18. The construction according to claim 13 wherein said foam sheet having a length about 10 mm greater than a length of a small diameter portion of a receiving grommet.

* * * * *